United States Patent [19]

Iwasaki et al.

[11] 4,220,226

[45] Sep. 2, 1980

[54] BRAKE DEVICE FOR A FRICTION PRESS

[75] Inventors: Shigeo Iwasaki; Hiroshi Haguchi, both of Okayama, Japan

[73] Assignee: Mitsuishi Fukai Tekkosho, Okayama, Bizenshi, Japan

[21] Appl. No.: 952,540

[22] Filed: Oct. 18, 1978

[30] Foreign Application Priority Data

Oct. 28, 1977 [JP] Japan .............................. 52/144702

[51] Int. Cl.² .............................................. F16D 51/06
[52] U.S. Cl. .................................. 188/77 R; 188/170; 188/249
[58] Field of Search ............... 188/170, 166, 167, 168, 188/169, 171, 173, 77 W, 77 R, 249, 74–76, 250 A, 259

[56] References Cited

U.S. PATENT DOCUMENTS

| 3,310,136 | 3/1967 | Bricker et al. | 188/77 W |
| 3,907,075 | 9/1975 | Christison et al. | 188/77 W |

Primary Examiner—Douglas C. Butler
Attorney, Agent, or Firm—Wenderoth, Lind & Ponack

[57] ABSTRACT

A brake device for a friction press having a flywheel for driving a vertical threaded shaft, the flywheel being positioned between a pair of friction discs, the flywheel being driven in one direction or the other by the respective wheels. The brake device has a brake band generally in the shape of a circular arc which is engagable with the circumference of the flywheel at a position between the friction faces of the friction discs. The brake band is normally to be pressed by a tension spring against the circumference of the flywheel at all positions of the flywheel during its up and down movement, and a hydraulic device is provided which usually acts against the tension of the spring, to hold the brake band away from the flywheel but can apply the brake force instantaneously when necessary by ending the action of the hydraulic device.

4 Claims, 3 Drawing Figures

SUPPLY OF HYDRAULIC FLUID

BRAKE DEVICE FOR A FRICTION PRESS

The present invention relates to a brake device for a friction press.

BACKGROUND OF THE INVENTION AND PRIOR ART

A friction press, as is widely known, consists of a flywheel on a vertical threaded shaft which is threaded through a fixed nut, and a pair of friction discs connected by a common horizontal shaft, the flywheel being positioned between the two friction discs. By axially shifting the horizontal shaft, the flywheel is contacted by one or the other of the friction discs and driven in one or the other direction so as to raise or lower the vertical shaft and hence the press member which is pivotally mounted on a flange at the lower end of the vertical shaft.

Usually in a press of this type, in order to stop the press, one or the other of the friction discs is moved out of contact with the flywheel, ending the driving force on the flywheel. However, if the weight of the flywheel and the threaded shaft is very large, they may move down due to their weight which overcomes the frictional resistance due to the engagement between the threaded shaft and the nut.

OBJECT AND BRIEF SUMMARY OF THE INVENTION

The object of the invention is to provide a simple and effective means of braking the motion of the flywheel and positively and accurately avoid any possible danger in emergency such as the downward motion mentioned above.

This object is achieved by a brake device according to the invention for a friction press having a flywheel on a threaded shaft with a press member on the end thereof, the flywheel being between a pair of friction discs rotated on a shaft which is movable in the direction of its length for bringing one or the other of the discs into contact with the flywheel for driving the threaded shaft and press member up and down. The brake device comprises a brake band generally in the shape of an arc and which is engagable with the circumference of the flywheel at a position between the friction faces of the friction disc, spring means connected to said brake band for normally urging said brake band into contact with the flywheel, but is provided with a disengaging means action on said brake band to hold said brake band out of contact with the flywheel against the action of said spring means, however when necessary said disengaging means is to make said spring means free and quickly engages the brake band with said flywheel.

The invention will now be described with references to the accompanying drawings in which.

DETAILED DESCRIPTION OF THE INVENTION

Figure 1:
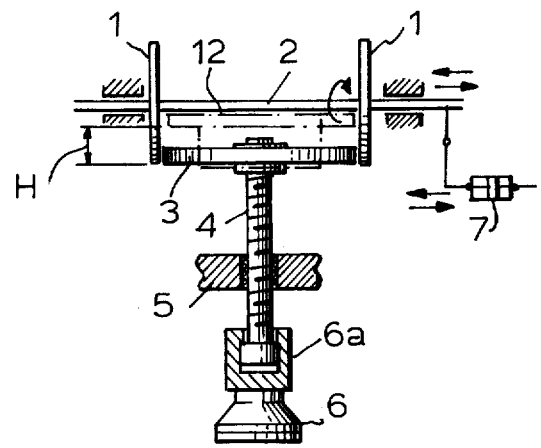
FIG. 1 is a side elevation view of a friction press with which the brake device of the present invention is useful.

As shown in FIG. 1, a pair of friction discs 1 has a flywheel 3 between them and mounted on a vertical rotatable shaft 4, the axis of which is perpendicular to the horizontal shaft 2 which connects the two friction discs 1. The flywheel shaft 4 is externally threaded at its lower part and engages with a nut 5 fixed to the frame of the press. On the bottom end of the shaft 4 is a press member 6 pivotally connected to the shaft 4 by a flange 6a.

The horizontal shaft 2 that connects the friction discs 1 shifts horizontally to the right and left in FIG. 1 by means of a suitable hydraulic drive means 7. By this shifting of shaft 2, the inner face of one or the other of the friction discs is brought into contact with the circumference of flywheel 3 and drives the flywheel in one or the other direction to cause the threaded shaft to ascend or descend through the press stroke H.

Figure 2:
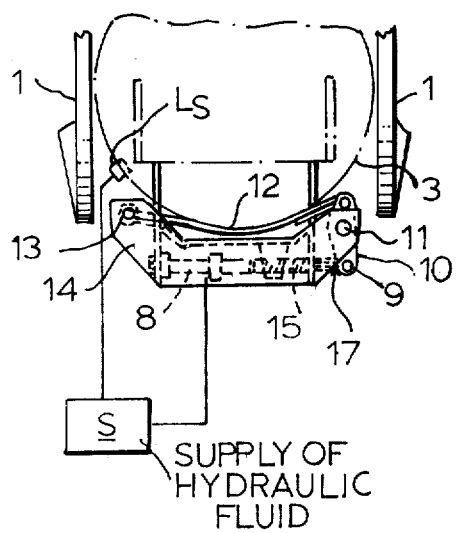
FIG. 2 is a partial plan view of the friction press of FIG. 1.
Figure 3:
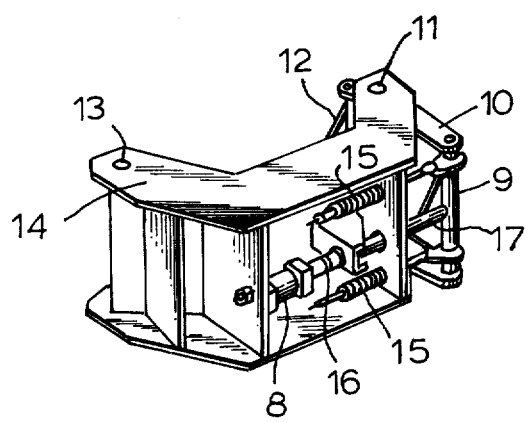
FIG. 3 is a perspective view of the brake device according to this invention.

The braking means according to the present invention comprises, as shown in FIGS. 2 and 3, a frame 14 mounted laterally of the shaft 2 to the side of the press. The frame 14 has two pins 11 and 13 on the opposite ends thereof, and on the pin 11 are pivotally mounted a pair of arms 10. A semicircular brake band 12 has one end connected to the one ends of the arms 10 close to the flywheel 3 and other end connected to the pin 13, fixed on the frame 14, while between the opposite ends of the arms 10 is mounted an upright post 9. The band 12 has a transverse dimension such that it is always in contact with the flywheel 3 regardless of the vertical position of the flywheel in its stroke H.

Tension spring means 15 attached between the upper and lower parts of the upright post 9 and the frame 14 pivot the arms 10 to press the brake band 12 against the circumference of the flywheel 3. The upright post 9 has a pin 17 extending horizontally therefrom, which is pushed by the end 16 of a releasable engaging means, such as a hydraulic piston 8. The brake band 12 moves away from the flywheel 3 and the brake force on the flywheel is released when pin 17 on the upright bar 9 is pushed to the right, as seen in FIG. 3, by the hydraulic piston 8 supplied with hydraulic fluid from a source S. The tension spring force and the clearance between the piston rod end 16 and the projecting pin 17 can be easily adjusted for any conditions before use of the braking means.

In operation, ususally with the hydraulic piston 8 extended to the right so as to keep the brake band 12 disengaged from flywheel 3 during when the action of the press member 6 is continued. When the driving in the direction of the up or down stroke is ended, by the opposite rotation of the flywheel 3, shaft 4 is driven to the lower or upper end of the stroke. And at any point a signal by some electro-magnetic means such as a limit switch LS or other means actuates the supply S for the hydraulic piston 8 to actuate the hydraulic piston to withdraw the rod end 16 to the left. Upon the withdrawal of the rod end 16 of hydraulic piston 8, the spring means 15 act immediately to pivot the arms 10 to engage the brake bane 12 to brake and hold the flywheel 3 steady. The brake device works automatically at once when required and prevents the downward movement of the press member 6 due to its own weight.

As described above, this invention provides a braking means which acts quickly to insure safety when the press is free by some reasons, although the construction is simply and the cost is low. Further, the width of the brake band 12 is sufficient to cover the whole range of the press stroke H, so that the brake device can act at all positions of the press stroke if necessary.

We claim:

1. A brake device for a friction press having a flywheel on a threaded shaft with a press member on the lower end thereof, the flywheel being between a pair of friction discs rotated on a shaft which is movable in the direction of its length for bringing one or the other of the discs into contact with the flywheel for driving the threaded shaft and press member up and down, said brake device comprising a brake band generally in the shape of an arc and which is engagable with the circumference of the flywheel at a circumferential position between the friction faces of the friction discs and having a transverse dimension sufficient to contact said flywheel at all positions in the up and down movement of the flywheel in the threaded shaft, spring means connected to said brake band for normally tensioning said brake band to decrease the curvature of the arc for urging said brake band into contact with the flywheel, and releasable disengaging means usually acting on said brake band to prevent application of tension thereto to hold it out of contact with the flywheel against the action of said spring means, but whereby when necessary said disengaging means is actuated to release said spring means quickly and tension the brake band to engage it with said flywheel.

2. A brake device as claimed in claim 1 in which said brake device further comprises a frame extending only part way around said flywheel and having a dimension for fitting between the friction discs, said brake band having one end pivotally mounted on said frame, and an arm means pivotally mounted on the other end of the frame having one end at the end of a chord extending from the pivotal mounting of the one end on said frame and intersecting the periphery of the flywheel and the other end of the brake band being pivotally connected to said one end of said arm, said spring means and said releasable disengaging means being connected to the other end of said arm means.

3. A brake device as claimed in claim 2 in which said spring means comprise springs connected between said frame and said arm means for pivoting said arm means in one direction for tensioning said brake band to urge said brake band against said flywheel, and said releasable disengaging means comprises means urging said arm means to pivot in the opposite direction.

4. A brake device as claimed in claim 3 in which said releasable disengaging means is a hydraulic piston means.

* * * * *